United States Patent [19]

Smith

[11] 4,263,831
[45] Apr. 28, 1981

[54] WELD NUT

[76] Inventor: Wallace E. Smith, 400 Industrial Dr., Plymouth, Mich. 48170

[21] Appl. No.: 966,840

[22] Filed: Dec. 6, 1978

[51] Int. Cl.³ .............................................. F16B 37/06
[52] U.S. Cl. .................................................. 411/171
[58] Field of Search ....................... 85/32 WE, 32 K; 151/41.7, 41.72, 41.73; 10/86 CL

[56] References Cited

U.S. PATENT DOCUMENTS

| 2,167,285 | 7/1939 | Smith | 10/86 CL X |
| 2,201,067 | 5/1940 | Whitmer | 151/41.7 UX |
| 2,709,469 | 5/1955 | Tripp et al. | 151/41.7 X |
| 3,020,987 | 2/1962 | Schaurte | 151/41.7 UX |
| 3,140,738 | 7/1964 | Johnson | 151/41.7 |
| 3,435,871 | 4/1969 | Johnson | 151/41.7 |

FOREIGN PATENT DOCUMENTS 731857 6/1955 United Kingdom ................ 151/41.7
732714 6/1955 United Kingdom ................ 10/86 CL Primary Examiner—Ramon S. Britts
Attorney, Agent, or Firm—Reising, Ethington, Barnard, Perry & Brooks

[57] ABSTRACT

A weld nut for use in securing a fastener to a sheet of supporting material. The weld nut comprises a triangular-shaped plate with truncated vertices. The plate has a mating surface from which are raised first, second and third integral projections. Each of the integral projections has a frusto-conical body with a rounded top and is surrounded by an annular channel to contain the flow of the material forming the projection when the nut is welded to the supporting material. Each channel preferably intersects an adjacent truncated end to permit the formation of an external fillet.

5 Claims, 3 Drawing Figures

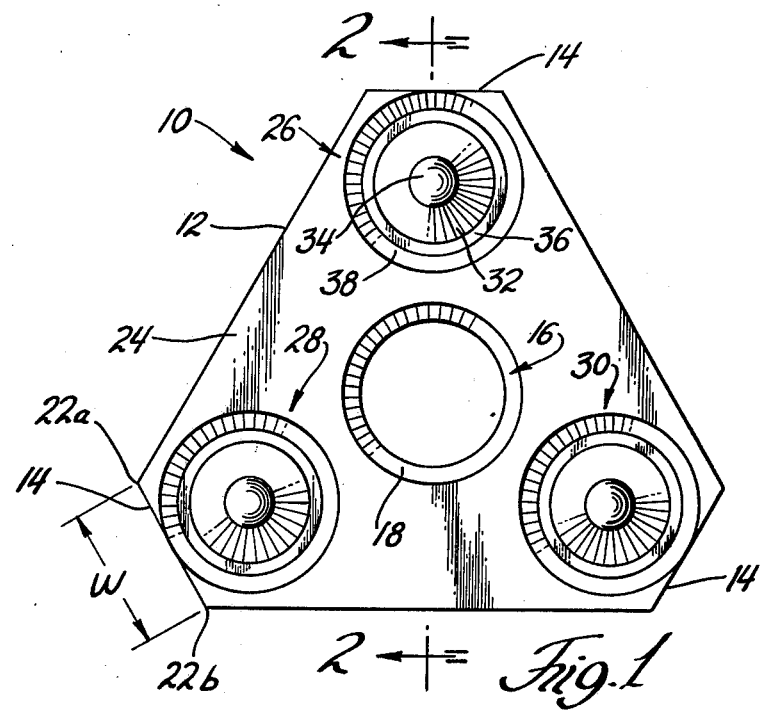
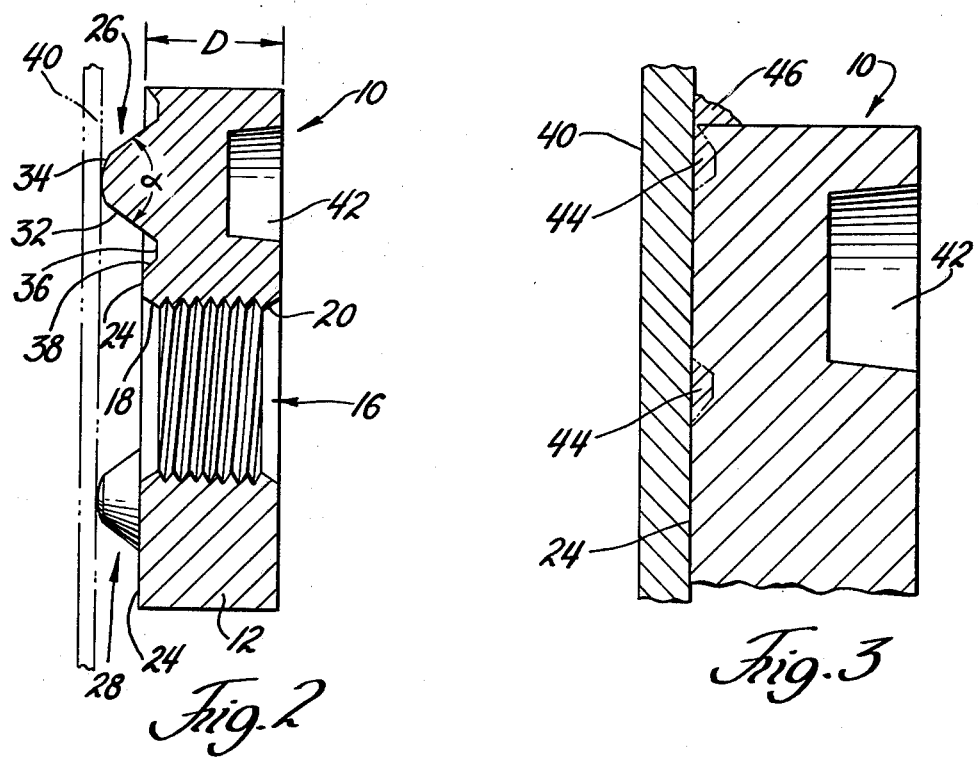

WELD NUT

TECHNICAL FIELD

This invention relates to weld nuts which are secured to an apertured support member by a welding process to permit the support member to receive a complementary fastener.

BACKGROUND ART

A weld nut is welded to sheet metal or similar type supporting material to permit the sheet metal to receive a complementary fastener. The sheet metal alone is ordinarily insufficient to support the fastener, and the weld nut provides the required supporting strength.

A typical weld nut is formed from a piece of flat metal stock and has a central tapped hole formed therethrough for the receipt of a threaded bolt. The surface of the weld nut which is to bear against the sheet metal or supporting material includes a plurality of raised integral projections or nibs. The nut can be secured to the supporting material by resistance welding which causes the projections to flow and alloy with the supporting material.

One concern in the use of weld nuts is that the weld be secure. This requires a fusion of sufficient material to maintain the weld through all types of normal use. Of particular concern is the problem of the weld nut not seating flush against the supporting material. Where a rectangular weld nut is used with four projections, i.e. one at each vertex, there is the possibility that the nut will not seat flush with the supporting material if there is any discrepancy in the height of the projections. This can be especially troublesome if resistance welding is used to join the nut to the supporting material and there is an air gap between a projection and the supporting material. Moreover, the misorientation of the nut may cause crossthreading with the bolt which it receives.

Another concern is that the fusion must not be so extensive that weld flash or splatter reaches into the tapped hole or aperture in the weld nut and interferes with the entry of the bolt.

In addition, the weld nut must be given to high volume manufacture at relatively low cost in order to be cost-effective with competing forms of fasteners.

It is, therefore, an objective of the invention to provide a weld nut which will form a secure weld with a supporting material.

It is another objective of the invention to provide a weld nut which is designed to be free of weld flash or splatter in the aperture of the weld nut.

It is yet another objective of the invention to provide a weld nut design which is relatively low cost to manufacture.

DISCLOSURE OF THE INVENTION

A weld nut in accordance with the present invention includes a nut body defined by a flat metal plate. The flat metal plate has the shape of an equilateral triangle with its vertices truncated by flattening or rounding. A central opening is formed through the nut body to receive a complementary fastener. In a typical embodiment, the central opening is a tapped hole.

One of the surfaces of the nut body is adapted to bear against the supporting material after welding and is termed a mating surface. A set of first, second and third integral projections or nibs are raised from the mating surface. The raised projections are spaced about the central opening in equilateral relation with respect to one another. Each projection has a frusto-conical body with a rounded top. In the preferred embodiment, one raised projection is formed near each truncated vertex of the triangular shaped flat plate defining the nut body.

Each of the raised projections is surrounded by an annular channel. The annular channel serves to accommodate metal flow when the projections are welded to the supporting material. In this regard the annular channels contain the flow and prevent weld flash or splatter from reaching the central opening through the nut. In addition, the channels permit the mating surface of the weld nut to seat against the suppporting material without an air gap in between. By forming each channel to intersect with a flattened or rounded vertex it provides a path for material to flow outwardly and form an external fillet.

Other advantages of the present invention will be readily appreciated as the same becomes better understood by reference to the following detailed description when considered in connection with the accompanying drawings.

BRIEF DESCRIPTION OF THE DRAWINGS

FIG. 1 is a plan view of the mating surface of a weld nut embodying the present invention;

FIG. 2 is a cross-sectional view taken along line 2—2 of FIG. 1 and which shows the weld nut ready to be welded to a sheet of supporting material; and FIG. 3 is an enlarged cross-sectional view of a portion of the weld nut showing it welded to the sheet of supporting material.

BEST MODE FOR CARRYING OUT THE INVENTION

A weld nut embodying the present invention is shown generally at 10 in the drawings. With combined reference to FIGS. 1 and 2, the weld nut 10 comprises a body 12 formed of a flat triangular steel plate of sufficient thickness to support a threaded bolt or similar type fastener. The triangular shape of the body 12 is preferably modeled after an equilateral triangle, i.e. each side is of equal length. A modification from the triangular shape occurs at the vertices which are truncated to form ends 14; in this context the term "truncated" is meant to include both rounded and flattened. In the preferred embodiment, the width W between the points 22a and b, which represent the transition points between the triangular shape of the plate 12 and the truncated end 14, is no less than the thickness D of the plete; i.e. the ratio W:D is $\geq 1$.

A central opening 16 is formed through the nut body 12. The central opening 16 is typically tapped to receive a threaded bolt. It has chamfers 18 and 20 formed at its opposite ends to facilitate engagement of the nut 10 with a threaded bolt.

Either side of the weld nut 10 can have a local extrusion (not shown) formed about the periphery of the central opening 16. The extrusion can be used as a pilot if formed on the same side as the projections. The wall thickness of the extrusion will be less than or equal to the thickness D of the plate 12 depending on specific requirements.

The surface of the weld nut 10 which is to be mated with a sheet of supporting material, e.g. as indicated by the phantom lines 40 in FIG. 2, is termed a mating surface 24 and is substantially planar. The mating surface 24 has formed in it a set of first, second and third integral raised projections or nibs 26, 28, and 30, respectively. The projections 26, 28 and 30 are spaced about the central opening 16 in equilateral relation to one another. More particularly, each of the projections 26, 28 and 30 is formed in proximity to a flattened end 14, and includes a generally frusto-conical body 32 which terminates in a rounded top 34. The rounded top 34 provides good contact resistance with the supporting material 40 for resistance welding, yet is not so pointed as to puncture the supporting material when pressure is applied to join the nut to the material in the welding process. Accordingly, the rounded top 34 requires a relatively small amount of initial current to begin the melting process and the frusto-conical body 32 continues this efficient melting process. The energy efficiency is greater as compared with other shapes of projections or nibs.

It is preferred that for each projection, the smaller, outer end of the frusto-conical portion, where it joins to the rounded portion 34, have a diameter approximately one-half the diameter of the larger, inner end of the frusto-conical portion. Additionally, it is preferred that the angle of taper $\alpha$ of the frusto-conical portion be from 60°–90°, such angle being 70° in the preferred embodiment shown.

An annular channel is formed in the mating surface 24 in surrounding relation to each of the projections 26, 28 and 30. The annular channel is defined by a lower wall 36 and a flared side wall 38. Each of the channels preferably intersects an adjacent truncated end 14 to provide a path for material to flow outwardly and form an external fillet. However, if no fillet is desired, the channel can be formed to completely surround the projection.

As has been stated, each projection is frusto-conical with a rounded top. As can best be seen in FIG. 2, this is true with respect to the projection portion which extends above the mating surface 24 and, in the embodiment shown, the frusto-conical shape extends to the bottom of the channel.

A blind hole 42 is formed in the surface of the nut body 12 opposite the bearing surface 24. The blind hole 42 results from stamping the body 12 to form the raised projections 26, 28 and 30 and annular channels in the bearing surface. As a consequence, a blind hole such as 42 complements each of the projections 26, 28 and 30.

With reference to FIG. 3, the manner in which the weld nut 10 is secured to the supporting material 40 is next described. By resistance welding the weld nut 10 to the supporting material 40, the projections are caused to flow and alloy with the supporting material to form a weld. The extruded material 44 forming the projections flows radially outward and fills the annular channel surrounding the original projection. An external fillet 46 is formed adjacent the point where the flattened end 14 and annular channel intersect. The extruded material 44 is contained at the diametrically opposed side of the channel to prevent weld flash or splatter from reaching the central opening 16.

As a result, the weld nut 10 is secured to the supporting material 40 by at least three welds symmetrically spaced around the central opening. The nut 10 is seated against the supporting material 40 such that the mating surface 24 is flush therewith without an intervening air gap.

The invention has been described in an illustrative manner, and it is to be understood that the terminology that has been used is intended to be in the nature of word description rather than limitation.

Many modifications and variations of the present invention are possible in light of the above teachings. It is, therefore, to be understood that within the scope of the appended claims, the invention may be practiced otherwise than as specifically described.

The embodiments of the invention in which an exclusive property or privilege is claimed are defined as follows:

1. A weld nut comprising a metal plate having a substantially planar mating surface and a central opening adapted to receive a complementary fastener and having a set of three projections formed integrally with the mating surface and spaced equilaterally with respect to one another about the central opening, each of said projections being completely surrounded by an annular channel in the mating surface which intersects with an edge of the plate to accommodate metal flow from the projection to said edge during welding, the portion of each of said projections extending above said mating surface having a frusto-conical shape with a rounded top.

2. A weld nut as set forth in claim 1 wherein the frusto-conical portion of each of said projections has an angle of taper of from 60° to 90°.

3. A weld nut comprising a triangular-shaped metal plate with truncated vertices, said plate having a substantially planar mating surface and a central opening adapted to receive a complementary fastener and having a set of three projections formed integrally with the mating surface and spaced equilaterally with respect to one another about the central opening, each of said projections being completely surrounded by an annular channel in the mating surface which intersects with an edge of the plate to accommodate metal flow from the projection to said edge during welding, the portion of each of said projections extending above said mating surface having a frusto-conical shape with a rounded top.

4. A weld nut as set forth in claim 3 wherein the width of each of the truncated vertices is not less than the thickness of the plate and wherein the frusto-conical portion of each of said projections has an angle of taper of from 60° to 90°.

5. A weld nut as set forth in claim 3 wherein each channel intersects the edge of the plate on one of the truncated vertices thereof.

* * * * *